United States Patent
Burns (10) Patent No.: US 9,719,375 B2
(45) Date of Patent: Aug. 1, 2017

(54) METHOD OF ENGINE SPLIT AND REASSEMBLY

(71) Applicant: ROLLS-ROYCE PLC, London (GB)

(72) Inventor: Michael Leslie Burns, Derby (GB)

(73) Assignee: ROLLS-ROYCE plc, London (GB)

( * ) Notice: Subject to any disclaimer, the term of this patent is extended or adjusted under 35 U.S.C. 154(b) by 519 days.

(21) Appl. No.: 14/527,074

(22) Filed: Oct. 29, 2014

(65) Prior Publication Data

US 2016/0047277 A1 Feb. 18, 2016

(30) Foreign Application Priority Data

Nov. 19, 2013 (GB) .................................. 1320424.3

(51) Int. Cl.
| | |
|---|---|
| *F01D 25/24* | (2006.01) |
| *F01D 25/28* | (2006.01) |
| *F02C 3/04* | (2006.01) |
| *B64F 5/50* | (2017.01) |

(52) U.S. Cl.
CPC .............. *F01D 25/243* (2013.01); *B64F 5/50* (2017.01); *F01D 25/285* (2013.01); *F02C 3/04* (2013.01); *F05D 2220/32* (2013.01); *F05D 2230/68* (2013.01); *F05D 2230/70* (2013.01); *F05D 2250/311* (2013.01); *F05D 2260/02* (2013.01)

(58) Field of Classification Search
CPC ........ F01D 25/243; F01D 25/285; B64F 5/50; F02C 3/04
See application file for complete search history.

(56) References Cited

U.S. PATENT DOCUMENTS

| 5,870,824 A | 2/1999 | Lilja et al. |
| 2008/0011932 A1 | 1/2008 | Stretton |

FOREIGN PATENT DOCUMENTS

JP H02-215904 A 8/1990

OTHER PUBLICATIONS

Jun. 18, 2014 Search Report issued in British Application No. 1320424.3.
Mar. 13, 2015 European Search Report issued in European Application 14 19 0641.

*Primary Examiner* — Moshe Wilensky
(74) *Attorney, Agent, or Firm* — Oliff PLC (57) ABSTRACT

A method of axially separating an annular system, such as a gas turbine engine (10), comprising first (34) and second (36) annular components. An annular array of fastenings (42) couples the first (34) and second (36) components together axially. The first (34) and second (36) components are supported by support tooling. The fastenings (42) are removed to leave one fastening (42) located on each side of the system. One of the remaining fastenings (42) is removed. The relative height of the first (34) and second (36) components is adjusted so that the apertures (46, 48) for the fastening (42) removed at the previous step are aligned. Then the final fastening (42) is removed.

13 Claims, 5 Drawing Sheets

METHOD OF ENGINE SPLIT AND REASSEMBLY

The present invention relates to a method of axially separating an annular system and a method of axially joining an annular system. It is particularly applicable where the annular system is a gas turbine engine comprising a fan case and a core engine, and where the annular system is oriented with its axis aligned with horizontal.

Gas turbine engines, particularly those used to power aircraft, must be transported off-wing periodically. For example, spare or replacement engines must be transported to the location of the storage facility or the aircraft to which they are to be fitted. Other engines must be removed from service and transported to the manufacturer or a repair and overhaul base for maintenance activity. Such transportation is typically achieved by loading the engine into the hold of a cargo aircraft such as a Boeing 747-400F or Boeing 777-200ERF.

Some modern gas turbine engines are too large to fit into the hold of such an aircraft. Thus it is necessary to split the engine into two components: the fan case and the core engine. Each of these components may then be loaded into the cargo bay separately, for example on air freight pallets, since neither of them exceeds the maximum dimensions of the hold and cargo bay doors.

The tolerances between the fan case and the core engine are small, for example in the region of a few millimetres. It is therefore necessary to carefully control the process of axially separating the fan case and core engine, and the method of axially joining them again after transportation, to prevent damage to either component caused by relative movement between them.

The present invention provides a method of axially separating an annular system and a method of axially joining an annular system that seeks to address the aforementioned problems.

Accordingly the present invention provides a method of axially separating an annular system; the system comprising a first annular component, a second annular component and an annular array of fastenings that couple the first and second components together axially through aligned apertures; the method comprising steps to:

a) support the first and second components with support tooling;
b) remove fastenings to leave one fastening located on each side of the system;
c) remove one of the remaining fastenings;
d) adjust the relative height of the first and second components so that the apertures for the fastening removed at step c) are aligned; and
e) remove the final fastening.

Advantageously the method of the present invention minimises the rotational misalignment between the first and second components before the final fastening is removed. This ensures that no contact between the components is likely even when the clearance between them is very tight, for example a few millimetres.

The locations in step b) may each be less than or equal to 15° from a horizontal plane through the diameter of the array of fastenings. Advantageously the last two fastenings are therefore close to the horizontal plane through the fastenings which is where the maximum rotational misalignment or displacement occurs.

Step b) may be modified to comprise leaving one fastening located on one side of the system and two fastenings located on the second side of the system; and the method may have a further step between steps b) and c) to:

remove one of the remaining fastenings on the second side and adjust the relative height of the first and second components so that the apertures for the removed fastening are aligned.

Advantageously adding this step reduces the amount of height adjustment required at each step.

Step b) may be further modified to comprise leaving two fastenings on the first side of the system and two fastenings on the second side of the system; and the method may have a further step before the previous further step to:

remove one of the remaining fastenings on the first side and adjust the relative height of the first and second components so that the apertures for the removed fastening are aligned.

Advantageously adding this step further reduces the amount of height adjustment required at each step.

The two fastenings located on the first or second side of the system are separated by less than or equal to 30°. Advantageously the two fastenings on one side are therefore close to the horizontal plane, which is where the maximum rotational misalignment or displacement occurs.

The first and second components may be supported in horizontal attitude. Advantageously the maximum gravitational effect on them is then compensated by the method of the present invention.

The method may comprise a further step to move the first and second components apart axially to separate the system. Advantageously the components remain in their previous attitude and alignment during the separation.

Each step to adjust the relative height of the first and second components may comprise raising or lowering the support tooling. Either or both of the components may be raised or lowered with the support tooling. One of the components may be raised and the other lowered. Advantageously the remaining fastenings ensure that the vertical movement of the support tooling corrects the rotational misalignment of the first and second components.

Each fastening may comprise a dowel or sleeve with a flange at one end. Advantageously the flange prevents the sleeve from passing all the way through the apertures through the components. Advantageously such a sleeve reacts the shear loads between the first and second components.

Each fastening may be at least partially threaded to engage tooling. Advantageously each fastening is internally threaded close to the flange so that tooling may be screwed into the fastening sufficiently to hold it firmly whilst it is withdrawn. Advantageously this reduces the risk of dropping the fastening as it is withdrawn and therefore reduces the risk of damaging any component it hits as it falls.

Each fastening may comprise a bolt. Advantageously such bolts are simple and effective to fastening two components together.

The aperture alignment may be determined by any one or more of the group comprising: temporary replacement of the fastening without friction; laser sighting; measurement of the overlap; and a fastening comprising stress measurement capability. Advantageously many of these are easily implemented without additional cost. Advantageously many of these have a high level of accuracy so that small misalignments can be seen and corrected.

The annular system may comprise a gas turbine engine. The first annular component may comprise a core engine. The second annular component may comprise a fan case. The method of the present invention ensures that there is little or no relative radial movement of the core engine and fan case when the final fastening is removed. Advantageously this ensures that the core engine and fan case do not collide despite the very tight tolerance usually provided between them.

Any combination of the optional features is encompassed within the scope of the invention except where mutually exclusive.

The present invention will be more fully described by way of example with reference to the accompanying drawings, in which.

Figure 1:
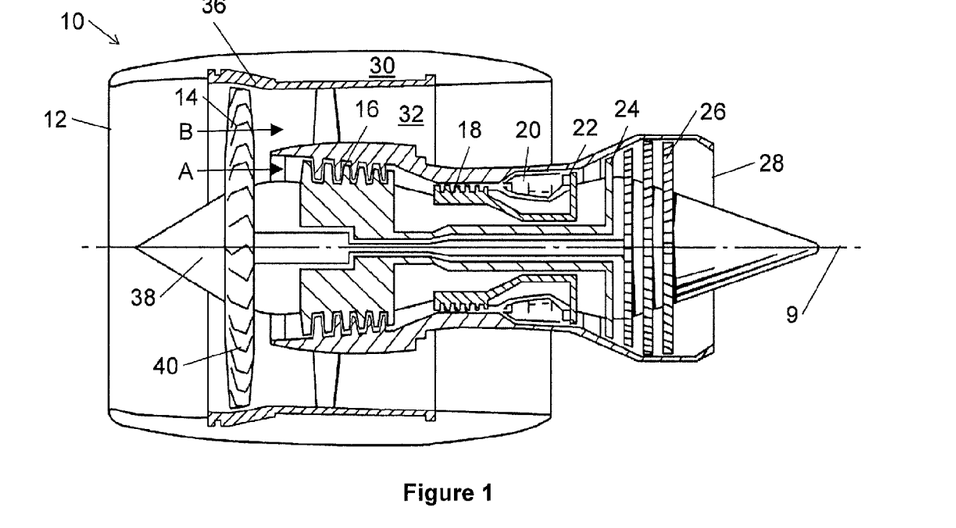
FIG. 1 is a sectional side view of a gas turbine engine.

A gas turbine engine 10 is shown in FIG. 1. It has a rotational axis 9 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. These components form the core engine 34. A nacelle 30 surrounds the gas turbine engine 10 and defines, in axial flow B, a bypass duct 32. The fan 14 and air intake 12 are surrounded by an annular fan case 36.

Figure 2:
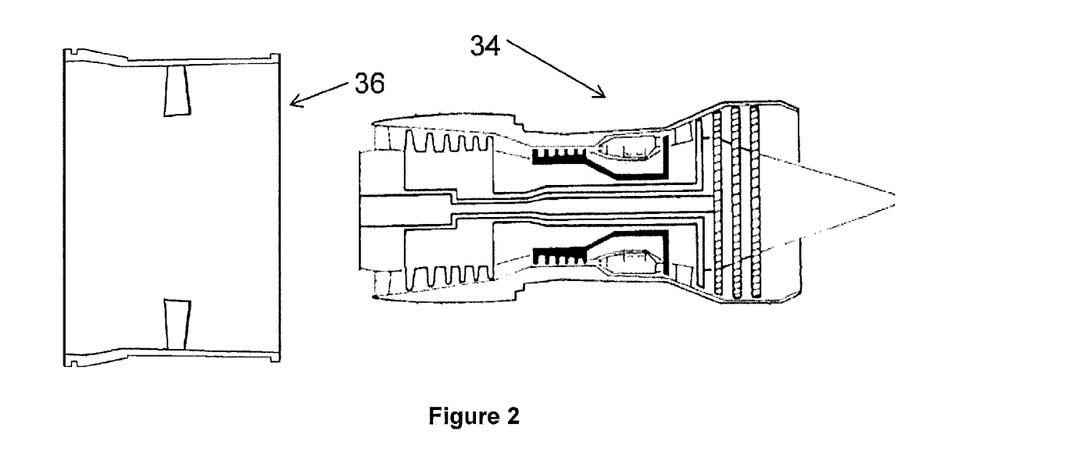
FIG. 2 is a sectional side view of the core engine and fan case of a gas turbine engine separated according to the method of the present invention.

FIG. 2 shows the core engine 34 and the fan case 36 when axially separated in the horizontal orientation, that is with the axis 9 substantially horizontal, according to the method of the present invention. Prior to axial separation according to the method the spinner 38 and fan blades 40 are removed. Also prior to axial separation according to the method, features of the engine 10 such as the bifurcation duct and A-frame may be removed.

Figure 3:
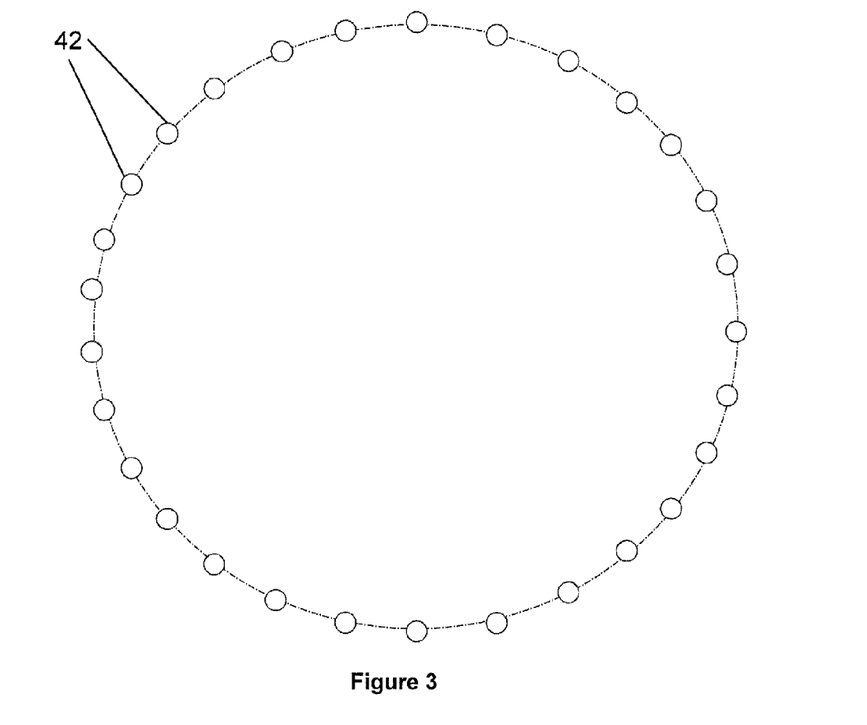
FIG. 3 is a schematic illustration of the joint area viewed in the axial direction at the beginning of the method of separation according to the present invention.

The core engine 34 and fan case 36 are coupled by an annular array of fastenings 42. FIG. 3 is a highly schematic illustration of the joint area between the core engine 34 and the fan case 36. It shows an annular array of fastenings 42, in the illustrated example there being twenty-nine fastenings 42, that are equi-angularly spaced around the circumference of the joint area. As will be apparent to the skilled reader, the number of fastenings 42 is dependent on the size of engine 10 and other mechanical factors.

Figure 4:
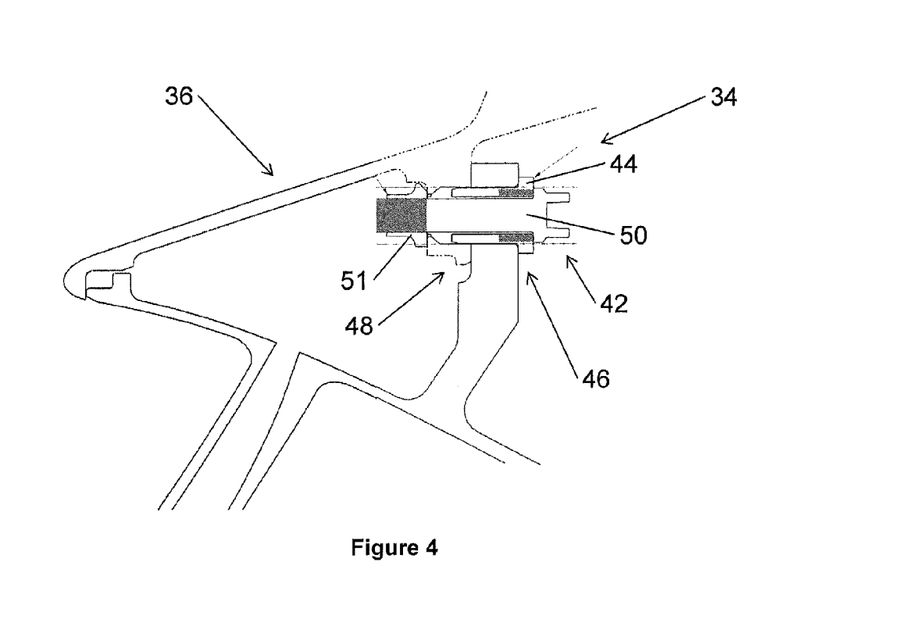
FIG. 4 is a sectional enlargement of part of the joint area between the core engine and fan case of a gas turbine engine.

FIG. 4 is an enlargement of a fastening 42 that can be used to releasably couple the fan case 36 to the core engine 34. The fastening 42 comprises a dowel 44 in the form of a sleeve with a flange extending outwards from one end. The dowel 44 is sized to slide into and seat snugly within an aperture 46 through the core engine 34 and an aperture 48 through the fan case 36 when the apertures 46, 48 are aligned. The dowel 44 reacts the shear loads between the fan case 36 and core engine 34. The flange of the dowel 44 is arranged and sized to seat against the core engine 34 to prevent further axial movement through the apertures 46, 48. The apertures 46, 48 may extend through flanges or other features of the core engine 34 and fan case 36 that are designed for the purpose of axially separating and joining the components together. The dowel 44 may be internally threaded for part of its axial length to enable engagement with an extraction tool. Alternatively the dowel 44 may comprise a bayonet type of arrangement on its internal surface that is arranged to engage with a complementary arrangement on an extraction tool.

The fastening 42 also includes a bolt 50 that passes through the tube of the dowel 44, with a clearance so it does not engage with the internal thread or bayonet arrangement if present. The head of the bolt 50 seats against the flange of the dowel 44. The shaft of the bolt 50 extends through the tube of the dowel 44 and protrudes from the distal end thereof to engage with a corresponding thread in a nut 51 swaged to or trapped in the fan case 36. Thus the fastening 42 firmly but releasably couples the fan case 36 to the engine core 34 and retains the dowel 44 in position. The bolt 50 may alternatively comprise different engagement features at its distal end to firmly engage with nut 51 in the fan case 36, such as a bayonet type arrangement.

The present invention comprises a method to axially separate an annular system, such as a gas turbine engine 10, which comprises a first annular component, such as the core engine 34, and a second annular component, such as the fan case 36. It finds particular utility where the annular system is arranged with its longitudinal axis horizontal, since gravity acting on the components causes shear loads on the joint therebetween. The method will be described in terms of a gas turbine engine 10.

In a first step of the method the gas turbine engine 10, in particular the core engine 34 and fan case 36, is supported by support tooling in horizontal attitude. There may be a single support tooling that supports both the core engine 34 and fan case 36 and which is arranged to have the requisite degrees of freedom of movement as described below. Alternatively there may be two pieces of support tooling, one arranged to support the core engine 34 and one arranged to support the fan case 36.

Figure 5:
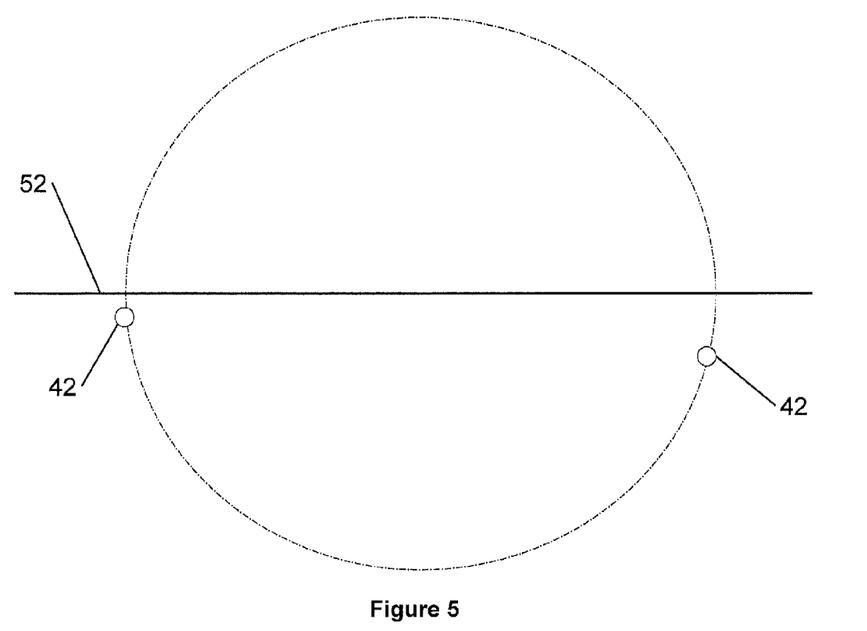
FIG. 5 is a schematic illustration of the joint area viewed in the axial direction after the second step of the method of separation according to the present invention.

In a second step of the method a plurality of the fastenings 42 are removed to leave two fastenings 42, one located on each side of the gas turbine engine 10 as shown in FIG. 5. The locations of these last two fastenings 42 are as close to the horizontal plane through the diameter 52 of the array of fastenings 42 as possible given the spacing of the fastenings 42 within the array. Preferably the locations of the last two fastenings 42 are diametrically opposed, that is the angle made between them and the centre point of the array is 180°. Where the locations of one or both of the last two fastenings 42 are not coincident with the horizontal plane through the diameter 52 of the array of fastenings 42 they should preferably each be less than or equal to 15° above or below this plane 52. Thus the angle made between the locations of the last two fastenings 42 and the centre point of the array is in the range of 150° to 210°.

Figure 6:
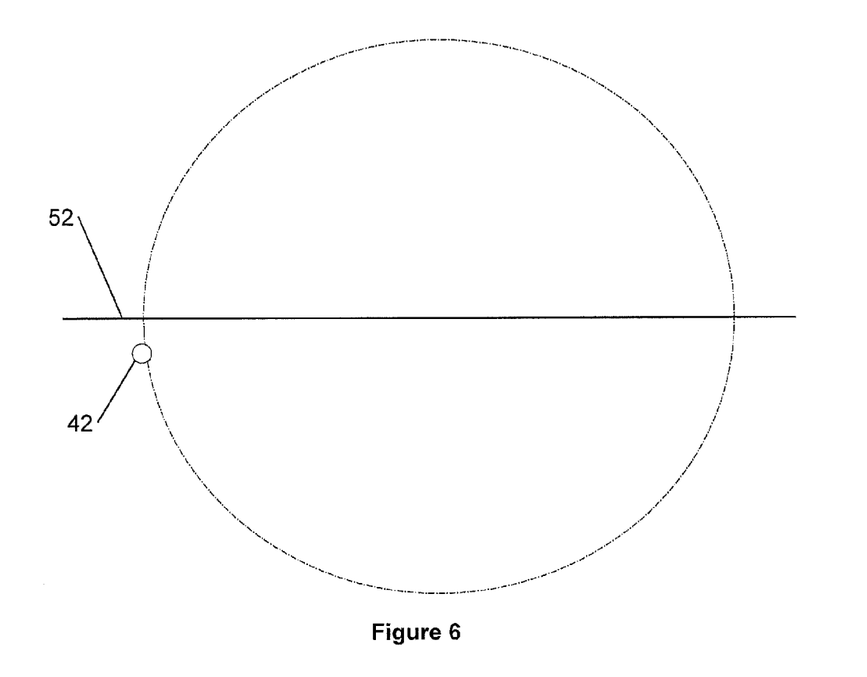
FIG. 6 is a schematic illustration of the joint area viewed in the axial direction after the third step of the method of separation according to the present invention.
Figure 7:
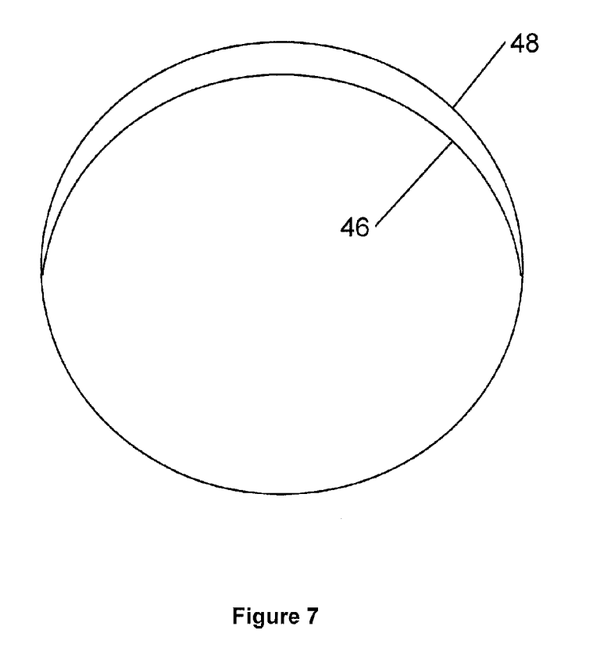
FIG. 7 is an axial view on the apertures through the core engine and fan case.

In a third step of the method one of the last two fastenings 42 is removed to leave one fastening 42 as shown in FIG. 6. The removal of this fastening 42 results in the relative load taken through the core engine 34 into the support tooling and the load taken through the fan case 36 into the support tooling to change. In consequence the aperture 46 through the core engine 34 and the aperture 48 through the fan case 36 become vertically misaligned, as shown in FIG. 7. This vertical misalignment is of the order of a few millimetres for a typical large aero gas turbine engine 10. The amount of vertical misalignment is proportional to the diameter of the joint area and the shear load, which itself is a function of the weight of the components. Therefore the amount of vertical misalignment experienced by larger or more massive annular systems may be of the order of tens or hundreds of millimetres.

Since one fastening 42 remains inserted through the apertures 46, 48 lateral movement of the core engine 34 relative to the fan case 36 is prevented although rotational movement will manifest as a vertical and a lateral component of misalignment. It is thus preferable that the last fastening 42 is the one that is closest to the horizontal plane 52 since it acts as the pivot point or fulcrum about which the fan case 36 and/or core engine 34 rotate. The most misalignment will be seen when the last fastening 42 is on the horizontal plane 52.

An advantage of the penultimate fastening 42 being less than or equal to 15° from the horizontal plane 52 is that this reduces, or minimises where it is coincident with the horizontal plane 52, the shear load on the fastening 42. This means it is easier to remove and less prone to damage during removal.

In a fourth step of the method the height of the support tooling, and therefore the relative vertical position of the core engine 34 and fan case 36, is adjusted. For example the core engine 34 may be raised using the support tooling. Alternatively the core engine 34 may be lowered or the fan case 36 may be raised or lowered using the support tooling. The relative height of the core engine 34 and fan case 36 is adjusted until the aperture 46 through the core engine 34 and the aperture 48 through the fan case 36 are realigned.

The apertures 46, 48 are realigned when they are concentric within the tolerance of the fastening 42 and apertures 46, 48. This may be determined by any appropriate process as apparent to the skilled reader. For example, the dowel 44 may be temporarily replaced through the aperture 46, 48 and the apertures 46, 48 be considered realigned if the dowel 44 can be replaced with less than a predefined level of friction or resistance. Alternatively laser sighting or measurement may be used to ascertain if there is any of the core engine 34 surface or flange visible in the aperture 48 through the fan case 36 or any of the fan case 36 surface or flange visible in the aperture 46 through the core engine 34.

Figure 8:
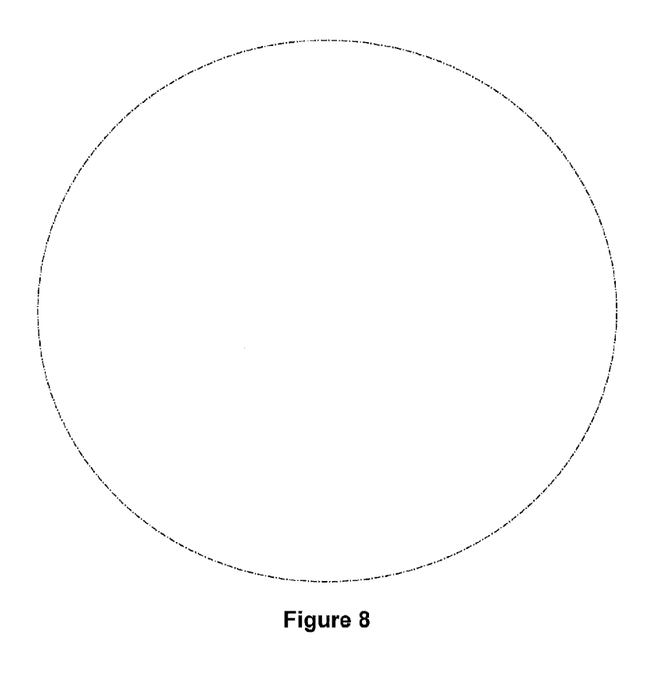
FIG. 8 is a schematic illustration of the joint area viewed in the axial direction after the fifth step of the method of separation according to the present invention.

In a fifth step of the method the final fastening 42 is removed so that the joint area has no fastenings 42 coupling the fan case 36 to the engine core 34, as shown in FIG. 8. Because the relative height of the engine core 34 and fan case 36 was adjusted in the fourth step of the method to take account of the shift of loading on the support tooling from the core engine 34 towards the fan case 36, when the final fastening 42 is removed there is little or no vertical movement. Advantageously this prevents contact between the fan case 36 and core engine 34, despite the very tight tolerance between them, and therefore prevents damage occurring due to the decoupling.

Optionally there is a further, sixth step of the method in which the core engine 34 and fan case 36 are axially separated. This may be achieved by translating the core engine 34 horizontally on its support tooling in an axially rearwards direction, or by translating the fan case 36 on its support tooling in an axially forwards direction. Alternatively both the fan case 36 and the core engine 34 may be horizontally translated axially away from each other, either simultaneously or alternately. A single support tooling may be used to support both the core engine 34 and the fan case 36 provided it has the capability to axially translate the core engine 34 and fan case 36 away from each other.

As will be apparent, once the gas turbine engine 10 is axially separated the core engine 34 and fan case 36 can be individually prepared for transportation, for example by securing to an air freight pallet and/or by encasing in packaging. The preparation for transportation of the fan case 36 may require that it be moved from the support tooling to an air freight pallet or the support tooling may be configured to act as the air freight pallet. Similarly the preparation for transportation of the core engine 34 may require that it be moved from the support tooling to an air freight pallet or the support tooling may be configured to act as the air freight pallet.

In order to reduce the vertical misalignment caused by the transfer of load from the core engine 34 towards the fan case 36 when the penultimate fastening 42 is removed in the third step of the method, optional additional steps can be performed between the second and third steps of the method. This necessitates a change to the second step of the method.

Figure 9:
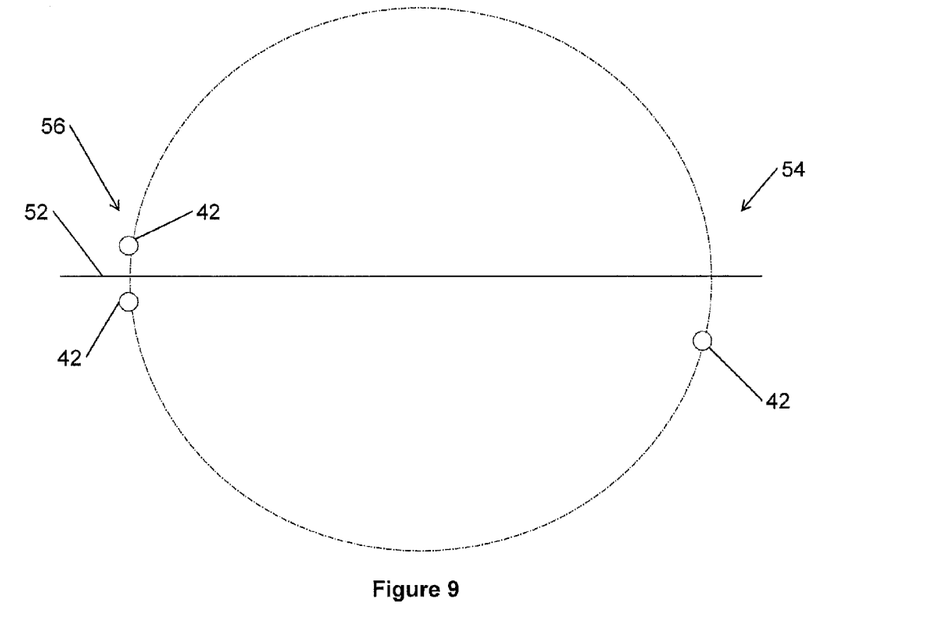
FIG. 9 is a schematic illustration of the joint area viewed in the axial direction after the modified second step of the method of separation according to the present invention.

Optionally the second step of the method may be modified so that fastenings 42 are removed from the array until there is one fastening 42 located on a first side 54 of the gas turbine engine 10 and two fastenings 42 located on the second side 56 of the gas turbine engine 10. As before, the remaining fastenings 42 are preferably coincident with or alternatively close to the horizontal plane 52 through the diameter of the array of fastenings 42. Advantageously the shear load experienced by each remaining fastening 42 is therefore minimised. An example of the joint area after the modified second step is shown in FIG. 9. The locations of the pair of fastenings 42 on the second side 56 of the gas turbine engine 10 make an angle of less than or equal to 30° with each other. As before, the location of each of the remaining fastenings 42 is less than or equal to 15° from the horizontal plane 52 through the diameter of the array of fastenings 42.

The method then comprises the additional step, between the modified second step and the third step, to remove one of the pair of remaining fastenings 42 on the second side 56 of the gas turbine engine 10 and to realign the apertures 46, 48 from which it is removed, as described with respect to the fourth step of the method.

Advantageously this additional step of the method results in a smaller vertical misalignment of the apertures 46, 48 to be compensated in each of the additional step and fourth step of the method as the total vertical misalignment is shared between the two steps.

Figure 10:
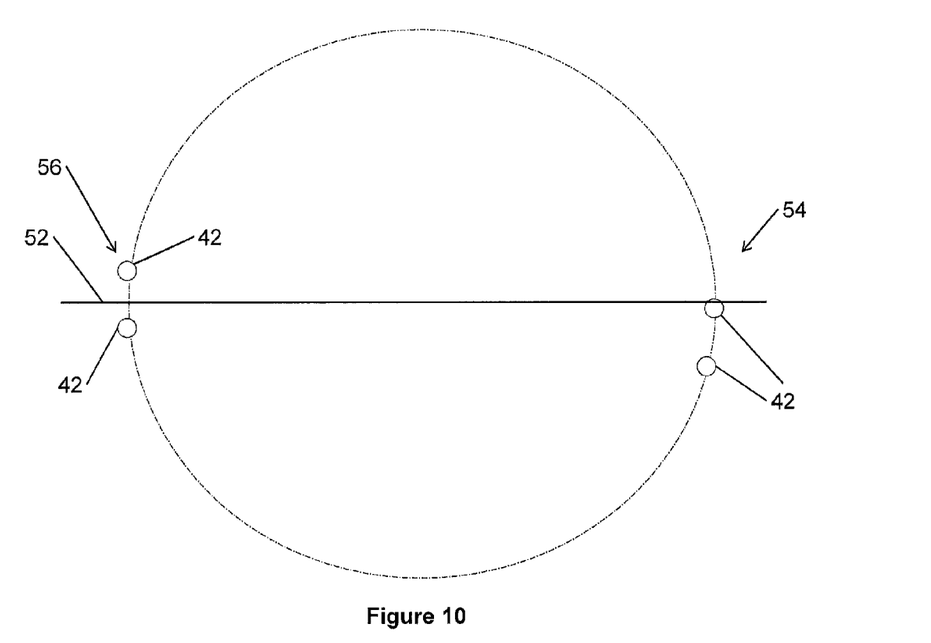
FIG. 10 is a schematic illustration of the joint area viewed in the axial direction after the further modified second step of the method of separation according to the present invention.

The second step of the method may optionally be further modified to leave two fastenings 42 located on each side of the gas turbine engine 10. As before, the remaining fastenings 42 are preferably close to the horizontal plane 52 through the diameter of the array to minimise the shear loads experienced by each. An example of the joint area after the further modified second step is shown in FIG. 10. The locations of the pair of fastenings 42 on the first side 54 make an angle of less than or equal to 30° with each other. The locations of the pair of fastenings 42 on the second side 56 of the gas turbine engine 10 also make an angle of less than or equal to 30° with each other. As before, the location of each of the remaining fastenings 42 is less than or equal to 15° from the horizontal plane 52 through the diameter of the array of fastenings 42.

The method then comprises a further step after the modified second step and before the additional step above to remove one of the pair of remaining fastenings 42 on the first side 54 of the gas turbine engine 10 and to realign the apertures 46, 48 from which it is removed, as described with respect to the fourth step of the method.

Advantageously this further step of the method results in an even smaller vertical misalignment of the apertures 46, 48 to be compensated in each of the additional step, further step and fourth step of the method as the total vertical misalignment is shared between the three steps.

As will be apparent to the skilled reader, it is possible to perform the height adjustment to realign the apertures 46, 48 after each fastening 42 is removed for more, or even all, of the array of fastenings 42. As will be apparent, the angular constraint of being within 15° from the horizontal plane 52 cannot be met for all the fastening locations around the circumference of the joint area. Nevertheless, it may be beneficial to maintain the constraint that the most recent pair of locations on one side are separated by no more than 30°.

The more realignment steps that are included in the method, the smaller each realignment need be and therefore the smaller the probability of the core engine 34 and fan case 36 colliding and thereby causing damage to either or both components, due to the change in load taken by the support tooling supporting each of these components. However, this benefit must be balanced in practical applications of the present invention by the additional time taken to perform the method having more steps. It is most beneficial that the sequence of fastenings 42 for which removal is immediately followed by the realignment step alternates from side to side of the gas turbine engine 10. In this way any rotational misalignment between the core engine 34 and fan case 36 is minimised before the final fastening 42 is removed. Thus if a fastening 42 is removed from the first side 54 and then the apertures 46, 48 realigned, the next fastening 42 to be removed should be from the second side 56 and vice versa.

It will usually be preferable that a pair of fastenings 42 left on one side of the gas turbine engine 10 will be adjacent. Nevertheless it is also possible for there to be one or more fastening locations from which the fastening 42 has been removed to be between the last pair of fastenings 42 on one side, provided that the angle between the remaining fastenings 42 on one side is not more than 30° and each is no more than 15° from the horizontal plane 52 through the diameter of the array of fastenings 42.

The method of separation is also applicable during reassembly of a gas turbine engine 10. The fan case 36 is brought into axial alignment with the core engine 34, with the engine axis 9 horizontal. The array of apertures 46, 48 are aligned and then the dowels 44 and bolts 50 are inserted in any order to secure the fan case 36 and core engine 34 together. The method of separation is then applied to the joint area between the fan case 36 and the support tooling that supports the fan case 36. Such support tooling generally being secured to the front of the fan case 36 by an annular array of fastenings 42. Such fastenings 42 may have the form described with respect to FIG. 4 but may alternatively comprise more simple bolts or the like which both couple the components and react the shear loads.

The method of separation has been described in terms of removing the fastenings 42 in a defined order. However, where the fastenings 42 have the form described with respect to FIG. 4, it is possible to remove all the bolts 50 in any order. The method is then applied only to the order of removal of the dowels 44, because these are the part of the fastenings 42 that react the shear loads. This advantage results from the structure of the fastenings 42 which separates the functions of reacting the shear loads and coupling the fan case 36 and core engine 34 together.

The fastening 42 has been described as a complementary dowel 44 and bolt 50. However, alternative types of removable fastening 42 are also contemplated within the scope of the claimed invention to enable the fan case 36 and core engine 34 to be releasably coupled together in the axial direction.

In some applications it may be beneficial to have fastenings 42 that are adapted to measure stress or strain. The fastenings 42 that are removed from pairs of apertures 46, 48 that are then aligned can therefore be used to indicate the amount and direction of relative movement required before the fastenings 42 are removed.

The external thread of the bolt 50 and the internal thread of the dowel 44 may have different pitch since they do not engage. In some applications the nut 51 may be omitted and the fan case 36 may comprise a threaded portion to receive and engage with the bolt 50.

Although the method of the present invention has been described with respect to a three-shaft gas turbine engine it is also applicable to a two-shaft gas turbine engine. In a two-shaft gas turbine engine the core engine 34 comprises the high pressure compressor 18, combustor 20, high pressure turbine 22 and low pressure turbine 26. It may also comprise a low pressure booster compressor.

Although the method of the present invention have been described with respect to a gas turbine engine for powering an aircraft, the method has equal felicity in separating and joining gas turbine engines for industrial and marine applications.

The methods also have applicability to other annular systems which need to be separated and joined axially, particularly those for which the tolerance between the first and second annular components is tight. For example, separating large diameter pipe sections of an oil or gas pumping pipeline. In this case the separated sections may be displaced vertically from each other, rather than axially.

The invention claimed is:

1. A method of axially separating an annular system (10); the system (10) comprising a first annular component (34), a second annular component (36) and an annular array of fastenings (42) that couple the first and second components (34, 36) together axially through aligned apertures (46, 48); the method comprising steps to:
    a) support the first and second components (34, 36) with support tooling;
    b) remove fastenings (42) to leave one fastening (42) located on each side of the system (10);
    c) remove one of the remaining fastenings (42);
    d) adjust the relative height of the first and second components (34, 36) so that the apertures (46, 48) for the fastening (42) removed at step c) are aligned; and
    e) remove the final fastening (42),
    wherein the annular system (10) comprises a gas turbine engine, the first annular component (34) comprises a core engine, and the second annular component (36) comprises a fan case.

2. A method as claimed in claim 1 wherein the locations in step 1.b) are each less than or equal to 15° from a horizontal plane (52) through the diameter of the array of fastenings (42).

3. A method as claimed in claim 1 in which step 1.b) is modified to comprise leaving one fastening (42) located on one side (54) of the system (10) and two fastenings (42) located on the second side (56) of the system (10), the method having a further step between steps 1.b) and 1.c) to:
   a) remove one of the remaining fastenings (42) on the second side (56) and adjust the relative height of the first and second components (34, 36) so that the apertures (46, 48) for the removed fastening (42) are aligned.

4. A method as claimed in claim 3 in which step 1.b) is further modified to comprise leaving two fastenings (42) on the first side (54) of the system (10) and two fastenings (42) on the second side (56) of the system (10), the method having a further step before step 3.a) to:
   a) remove one of the remaining fastenings (42) on the first side (54) and adjust the relative height of the first and second components (34, 36) so that the apertures (46, 48) for the removed fastening (42) are aligned.

5. A method as claimed in claim 3 wherein the two fastenings (42) located on one side (54, 56) of the system (10) are separated by less than or equal to 30°.

6. A method as claimed in claim 4 wherein the two fastenings (42) located on one side (54, 56) of the system (10) are separated by less than or equal to 30°.

7. A method as claimed in claim 1 wherein the first and second components (34, 36) are supported in horizontal attitude.

8. A method as claimed in claim 1 further comprising a step to move the first and second components (34, 36) apart axially to separate the system (10).

9. A method as claimed in claim 1 wherein the step to adjust the relative height of the first and second components (34, 36) comprises raising or lowering the support tooling.

10. A method as claimed in claim 1 wherein each fastening (42) comprises a sleeve (44) with a flange at one end.

11. A method as claimed in claim 1 wherein each fastening (42) is at least partially threaded to engage tooling.

12. A method as claimed in claim 1 wherein each fastening (42) comprises a bolt (50).

13. A method as claimed in claim 1 wherein the aperture (46, 48) alignment is determined by any one or more of the group comprising: temporary replacement of the fastening (42) without friction; laser sighting; measurement of the overlap; a fastening (42) comprising stress measurement capability.

* * * * *